US012686188B2

(12) United States Patent
Razeghi et al.

(10) Patent No.: US 12,686,188 B2
(45) Date of Patent: Jul. 21, 2026

(54) HYBRID PULTRUSION PLATES FOR A SPAR CAP OF A WIND TURBINE BLADE

(71) Applicants: BLADE DYNAMICS LIMITED, Hampshire (GB); LM WIND POWER A/S, Kolding (DK)

(72) Inventors: Rama Razeghi, Hampshire (GB); Jeppe Jørgensen, Kolding (DK)

(73) Assignees: Blade Dynamics Limited, Eastleigh (GB); LM Wind Power A/S, Kolding (DK)

( * ) Notice: Subject to any disclaimer, the term of this patent is extended or adjusted under 35 U.S.C. 154(b) by 123 days.

(21) Appl. No.: 18/030,738

(22) PCT Filed: Nov. 1, 2021

(86) PCT No.: PCT/EP2021/080265
§ 371 (c)(1),
(2) Date: Apr. 6, 2023

(87) PCT Pub. No.: WO2022/096416
PCT Pub. Date: May 12, 2022

(65) Prior Publication Data
US 2023/0382062 A1 Nov. 30, 2023

(30) Foreign Application Priority Data
Nov. 3, 2020 (GB) ...................................... 2017398

(51) Int. Cl.
B29C 70/52 (2006.01)
B29C 70/88 (2006.01)
(Continued)

(52) U.S. Cl.
CPC ............ B29C 70/52 (2013.01); B29C 70/887 (2013.01); *B29K 2307/04* (2013.01); *B29K 2309/08* (2013.01); *B29L 2031/085* (2013.01)

(58) Field of Classification Search
CPC .............................. B29C 70/52; B29C 70/887
See application file for complete search history.

(56) References Cited

U.S. PATENT DOCUMENTS

2011/0306718 A1* 12/2011 Scherzer ................ C08G 69/48
525/182
2014/0037842 A1* 2/2014 Tibor ..................... B05C 3/172
427/175
(Continued)

FOREIGN PATENT DOCUMENTS

CN 109094075 A 12/2018
EP 3026260 A1 6/2016
(Continued)

*Primary Examiner* — Andrew D Graham
(74) *Attorney, Agent, or Firm* — Dority & Manning, P.A.

(57) ABSTRACT

The present invention relates to a method of manufacturing a wind turbine blade shell component (38), the method comprising the steps of providing a plurality of pultrusion plates (64), arranging the pultrusion plates (64) on blade shell material (89) in a mould (77) for the blade shell component, and bonding the pultrusion plates (64) with the blade shell material to form the blade shell component, wherein each pultrusion plate (64) is formed of a pultrusion fibre material comprising glass fibres and carbon fibres. The invention also relates to a reinforcing structure for a wind turbine blade, the reinforcing structure comprising a plurality of pultrusion plates according to the present invention.

16 Claims, 5 Drawing Sheets

Figure 1:
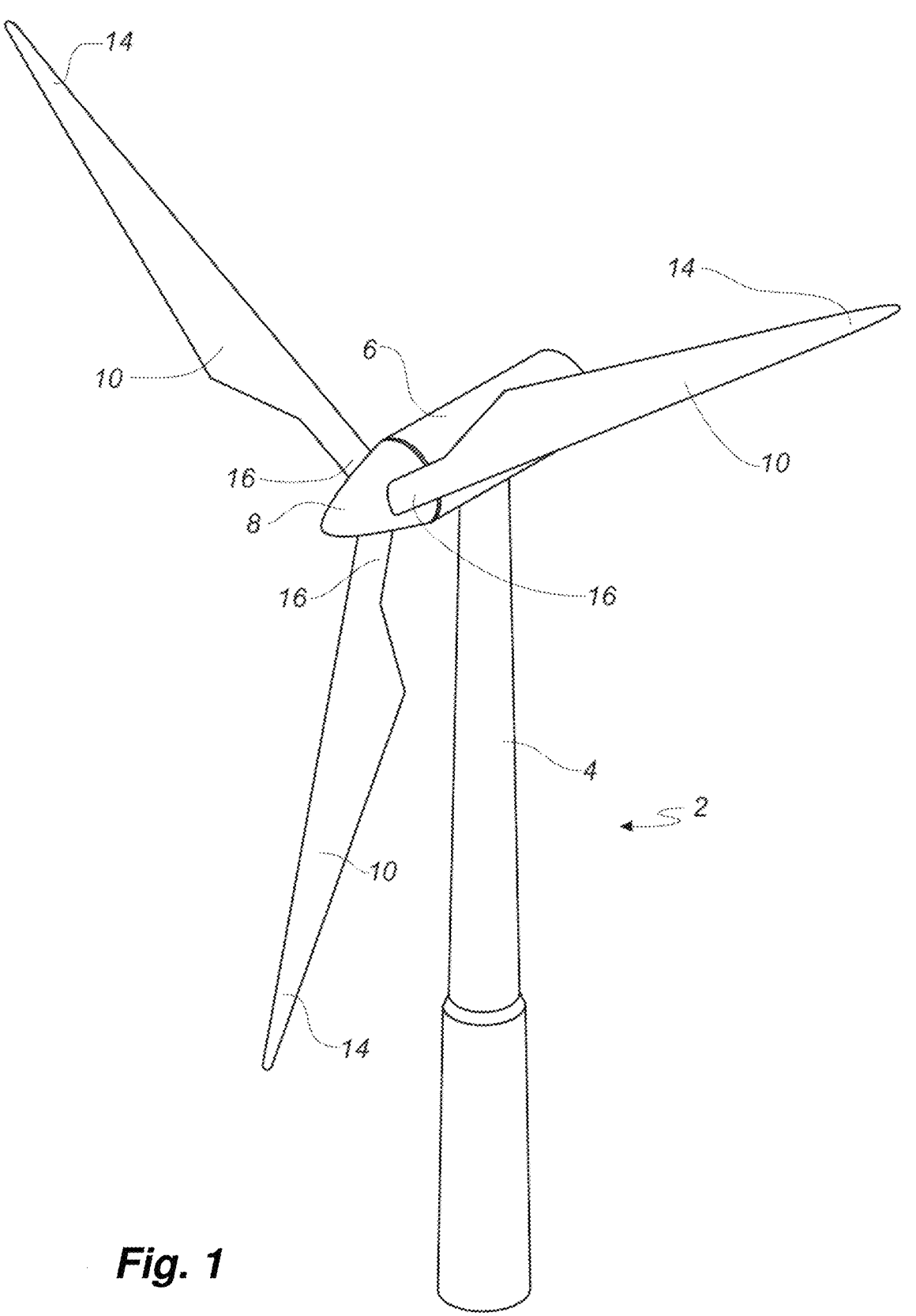

(51) Int. Cl.
  *B29K 307/04* (2006.01)
  *B29K 309/08* (2006.01)
  *B29L 31/08* (2006.01)

(56) References Cited

U.S. PATENT DOCUMENTS

| | | | | | |
|---|---|---|---|---|---|
| 2015/0151496 | A1* | 6/2015 | Kraatz | ................... | B29C 70/86 |
| | | | | | 428/36.5 |
| 2015/0204075 | A1* | 7/2015 | Tsukamoto | .......... | B29C 70/542 |
| | | | | | 264/479 |
| 2015/0316027 | A1* | 11/2015 | Sandercock | .......... | F03D 1/0675 |
| | | | | | 29/889.71 |
| 2016/0047252 | A1* | 2/2016 | Merzhaeuser | ........ | B29C 70/023 |
| | | | | | 156/247 |
| 2016/0146184 | A1* | 5/2016 | Caruso | ................. | F03D 1/0675 |
| | | | | | 156/60 |
| 2016/0146185 | A1* | 5/2016 | Yarbrough | ................ | B32B 5/22 |
| | | | | | 156/242 |
| 2016/0160837 | A1* | 6/2016 | Geiger | .............. | B29D 99/0028 |
| | | | | | 29/889.71 |
| 2016/0288431 | A1* | 10/2016 | Buehler | ................ | B29C 70/528 |
| 2017/0022825 | A1* | 1/2017 | Caruso | ................... | B29C 65/34 |
| 2017/0082089 | A1 | 3/2017 | Yarbrough et al. | | |
| 2017/0247502 | A1* | 8/2017 | Qian | .......................... | C08J 5/04 |
| 2017/0305078 | A1* | 10/2017 | Chtourou | ............. | B29C 70/521 |
| 2017/0320273 | A1* | 11/2017 | Peeters | ................ | B29C 70/222 |
| 2017/0334155 | A1* | 11/2017 | Buehler | ............ | B29D 99/0003 |
| 2018/0036970 | A1* | 2/2018 | Chmielewski | ........ | B29C 70/521 |
| 2018/0036971 | A1* | 2/2018 | Keil | ...................... | B29C 70/525 |
| 2018/0066396 | A1* | 3/2018 | Ratcliffe | ................ | B32B 27/38 |
| 2018/0252202 | A1* | 9/2018 | Johnson | ................ | B29C 70/342 |
| 2018/0372065 | A1* | 12/2018 | Livingston | ........... | F03D 1/0675 |
| 2018/0372066 | A1* | 12/2018 | Livingston | ........... | F03D 1/0675 |

FOREIGN PATENT DOCUMENTS

| | | | |
|---|---|---|---|
| EP | 3418557 | A1 | 12/2018 |
| EP | 3477097 | A1 | 5/2019 |
| EP | 3511154 | A1 | 7/2019 |
| WO | 2012161741 | A2 | 11/2012 |
| WO | 2015/011137 | A2 | 1/2015 |
| WO | 2021/213651 | A1 | 10/2021 |

* cited by examiner

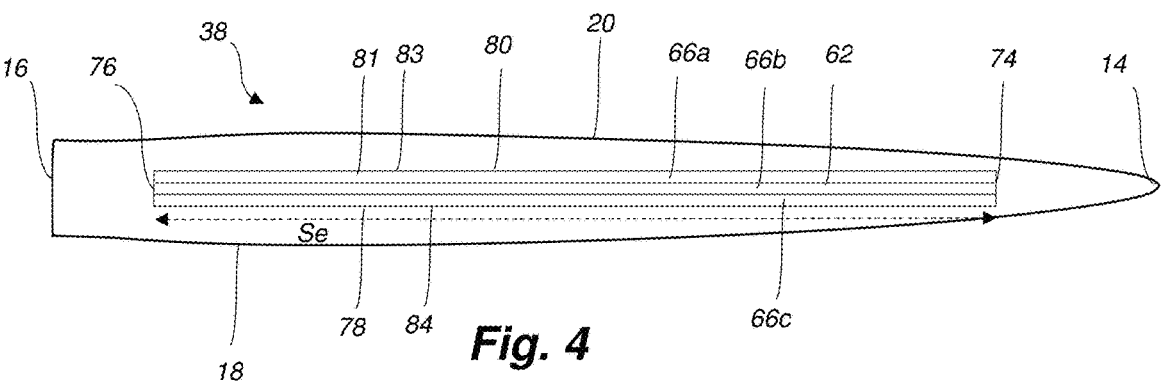
Fig. 4
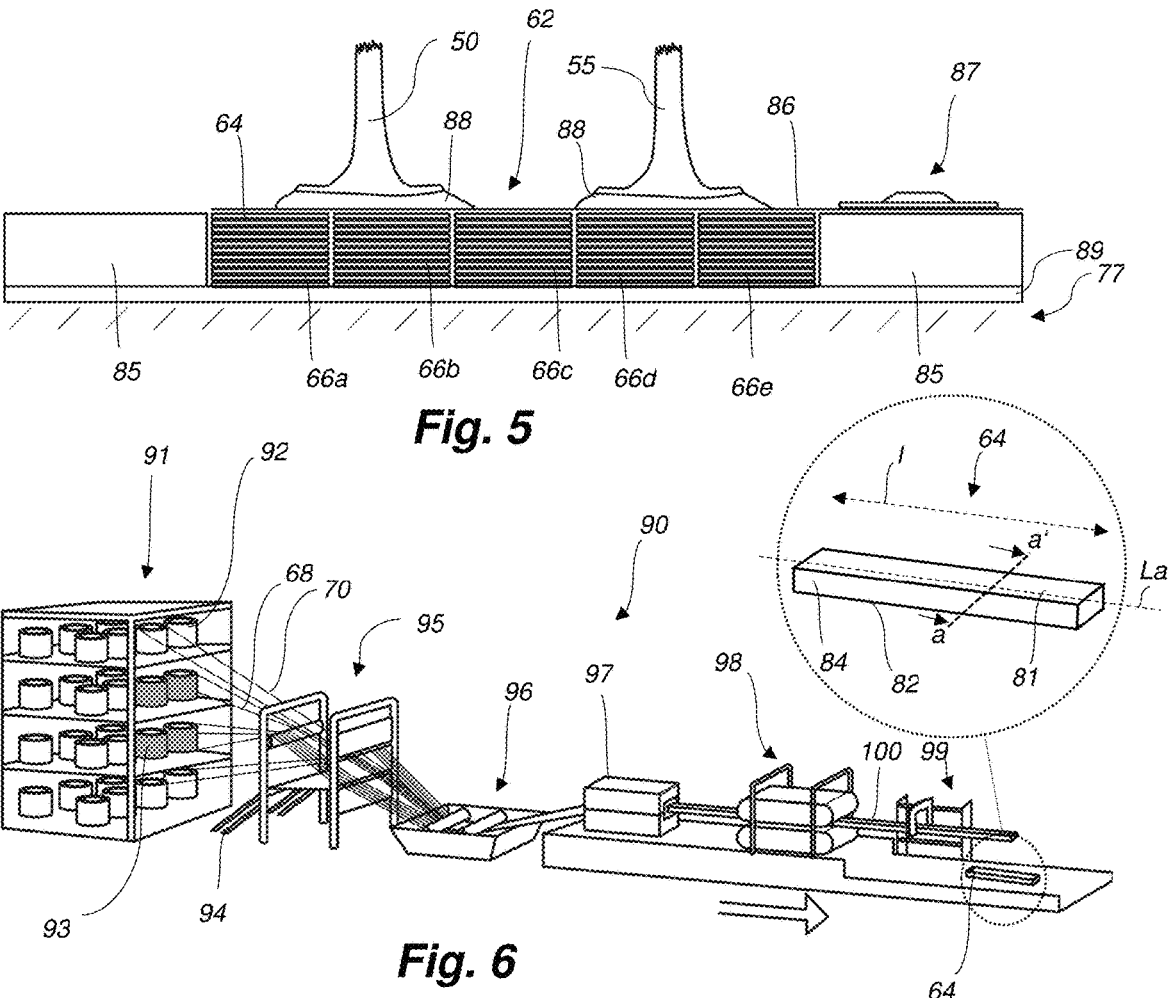
Fig. 5
Fig. 6

HYBRID PULTRUSION PLATES FOR A SPAR CAP OF A WIND TURBINE BLADE

This is a National Phase Application filed under 35 U.S.C. 371 as a national stage of PCT/EP2021/080265, filed Nov. 1, 2021, an application claiming the benefit of United Kingdom Application No. 2017398.5, filed Nov. 3, 2020, the content of each of which is hereby incorporated by reference in its entirety.

FIELD OF THE INVENTION

The present invention relates to a method of manufacturing a wind turbine blade shell component and to a reinforcing structure for a wind turbine blade, the reinforcing structure comprising a plurality of pultrusion plates.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbine blades increases, various challenges arise from such blades being subjected to increased forces during operation, requiring improved reinforcing structures. In some known solutions, pultruded fibrous strips of material are used. Pultrusion is a continuous process in which fibres are pulled through a supply of liquid resin and then heated in an open chamber where the resin is cured. Such pultruded strips can be cut to any desired length. As such, the pultrusion process is typically characterized by a continuous process that produces composite parts having a constant cross-section. Thus, a plurality of pultrusions can be vacuum infused together in a mould to form the spar caps.

Typically, a spar cap in a wind turbine blade is made from either carbon pultrusions or glass pultrusions. Carbon fibres are typically lighter than glass fibres by volume, and have improved tensile and compressive strength. One of challenges of wind turbine blade manufacturing is that a lightning protection system of the blade usually requires that at least some blade components have a sufficiently high electrical conductivity through the thickness of the components, such as reinforcing sections like spar caps. There is thus an ongoing need for an improved pultruded spar cap and method for incorporating such spar cap in a wind turbine blade.

It is therefore an object of the present invention to provide a wind turbine blade with an improved reinforcing structure, such as a spar cap.

It is another object of the present invention to provide an optimized arrangement of materials used in the manufacture of a spar cap.

It is another object of the present invention to provide a reinforcing structure for a wind turbine blade which is cost efficient structure and has optimized material characteristics for use in a lightning protection system of the blade.

It is another object of the present invention to provide a suitable reinforcing structure for a wind turbine blade which can be manufactured efficiently.

SUMMARY OF THE INVENTION

It has been found that one or more of the aforementioned objects can be obtained by providing a method of manufacturing a wind turbine blade shell component, the method comprising the steps of providing a plurality of pultrusion plates, arranging the pultrusion plates on blade shell material in a mould for the blade shell component, and bonding the pultrusion plates with the blade shell material to form the blade shell component, wherein each pultrusion plate is formed of a pultrusion fibre material comprising glass fibres and carbon fibres.

The present inventors have found that this method allows for tailoring the architecture of a hybrid glass/carbon pultrusion for use in a wind turbine blade spar cap, such that the carbon fibre material is utilized in the best possible way, in particular to enhance the lightning protection properties and structural performance of the blade. Thus, structural and lightning protection performance can be enhanced at minimum material cost. Carbon fibres usually have high electrical conductivity and high stiffness per weight. These properties are desirable in the spar cap of a wind turbine blade. However, drawbacks of carbon fibres include the relatively low strain to failure and the comparatively high price per kg. Glass fibres are typically cheaper and have higher strain to failure. However, the electrical conductivity of glass fibres is minimal and stiffness per weight is significantly lower.

In a preferred embodiment, the ratio of carbon fibre material to glass fibre material in the pultrusion plate is between 1/3 to 1/1. This was found to provide optimised properties of the pultrusion plate in terms of electrical conductivity and overall stiffness. In some embodiments, a conductive material, such as a carbon biax layer, a carbon veil or a glass/carbon hybrid fabric or a glass/carbon hybrid veil, is used to electrically connect the pultrusion plates transversely within a stack of adjacent pultrusion plates. This can be implemented as an interlayer between pultrusion plates or only as the first and/or last layer in the stack of pultrusion plates.

The step of arranging the pultrusion plates on blade shell material in a mould for the blade shell component preferably comprises arranging the pultrusion plates into adjacent stacks of pultrusion plates, wherein adjacent refers to a substantially chordwise direction. These stacks usually extend in a substantially spanwise direction of the shell half. The step of bonding the pultrusion plates with the blade shell material to form the blade shell component usually comprises a resin infusion step in which the pultrusion plates and the blade shell material are infused with a resin, for example in a VARTM process.

Each pultrusion plate comprises glass fibres and carbon fibres. In addition, each pultrusion plate preferably comprises a resin or binding agent which is used in the pultrusion process for joining the various fibre tows into a single pultrusion string. Preferably, each pultrusion plate comprises a matrix of fibre tows arranged in columns and rows, as seen in a vertical cross section of the plate. Thus, pultrusion fibre material may comprise glass fibres, carbon fibres, a resin or binding agent, and optionally additional reinforcing material. Typically, the pultrusion plate has a constant cross-section along its length.

Each stack of pultrusion plates may comprise 2-30, such as 5-20 pultrusion plates successively arranged on top of each other. Thus, each stack will usually extend in a spanwise direction of the blade. In a midsection between a root end and a tip end, each stack may comprise 8-15 layers of pultrusion plates, whereas towards the root end and towards the tip end the number of layered pultrusion plates may decrease to 1-3. Thus, the stack of pultrusion plates is preferably tapered towards both the root end and the distal end. Such configuration advantageously allows for a profile that is consistent with the thickness profile of the shell. Typically, two or more, or three or more stacks of pultrusion plates are arranged next to each other, adjacent to each other in a substantially chordwise direction. Typically, a resin will be infused in the stack of pultrusion plates. This can, for example, be done using vacuum-assisted resin transfer moulding.

The blade shell component is usually a shell half, such as a shell half with a reinforcing structure such as a spar cap. The blade shell material may include one or more fibre layers and/or a gelcoat. The plurality of pultrusion plates will typically extend in a spanwise direction of the shell half or of the blade. Thus, at least some of the pultrusion plates have preferably a length corresponding to 60-95% of the blade length. A polymer resin is typically infused into pultrusion plates following the lay-up into the shell half.

In a preferred embodiment, the pultrusion fibre material comprises a plurality of tows of glass fibre material and a plurality of tows of carbon fibre material. Thus, the ratio of numbers of carbon fibre tows to numbers of glass fibre tows in the pultrusion plate is preferably between 1/3 to 1/1. In a preferred embodiment, each tow comprises 10,000 to 100,000 filaments, preferably 20,000 to 60,000 filaments, of glass or carbon fibre.

In a preferred embodiment, the tows of glass fibre material and the tows of carbon fibre material extend substantially parallel to each other within the pultrusion plate. In a preferred embodiment, the tows of glass fibre material and the tows of carbon fibre material are arranged in an array, preferably a regular array, of rows and columns of tows, as seen in a vertical cross section of the pultrusion plate. The rows will typically extend in a substantially horizontal or chordwise direction, whereas the columns will typically extend in a substantially vertical or flapwise direction. The array of rows and columns of tows will typically be constant over the length of the pultrusion plate.

In a preferred embodiment, the pultrusion plates are arranged into adjacent stacks of pultrusion plates. Preferably, the pultrusion plates are arranged into adjacent stacks of pultrusion plates, wherein a continuous path of adjoining tows of carbon fibre material extends from the top surface of the uppermost pultrusion plate to the bottom surface of the lowermost pultrusion plate of each stack of pultrusion plates. Said continuous path of adjoining tows of carbon fibre material within the stack is preferably an electrically conducting path. Thus, the entire stack may conduct a lightning current from the top surface of the stack to the bottom surface of the stack, preferably in a substantially vertical or flapwise direction.

In some embodiments, the stacked pultrusion plates are pre-bonded together prior to being bonded to the blade shell. Alternatively, the stacked pultrusion plates are co-bonded with the blade shell materials. In a preferred embodiment, the stacked pultrusion plates are bonded with the blade shell material using an adhesive or in a vacuum assisted resin transfer moulding (VARTM) process.

In a preferred embodiment, each pultrusion plate comprises a top surface, an opposing bottom surface and two lateral surfaces, wherein at least one continuous path of adjoining tows of carbon fibre material is provided within the pultrusion plate, the continuous path of adjoining tows of carbon fibre material extending from the top surface to the opposing bottom surface of the pultrusion plate. Usually, the top and bottom surfaces face opposing flapwise directions, whereas the lateral surface face towards the trailing edge and towards the leading edge of the blade component, respectively. The present inventors have found that an efficient lightning protection system benefits from the conductive carbon fibre materials being connected electrically and/or physically throughout the reinforcing structure, in particular in the vertical or flapwise direction, to ensure that flashovers do not occur inside the spar cap when the blade is hit by a lightning strike. Thus, it is advantageous that the electrical conductivity through the thickness of the pultrusion plates is relatively high. Thus, the continuous path of adjoining tows of carbon fibre material extending from the top surface to the opposing bottom surface of the pultrusion plate may advantageously provide an electrically conducting path, in particular for lightning strikes, throughout the vertical direction of the pultrusion plate. In a preferred embodiment, the continuous path of adjoining tows of carbon fibre material extends substantially vertically within the pultrusion plate. In another embodiment, the continuous path of adjoining tows of carbon fibre material extends substantially diagonally within the pultrusion plate.

In a preferred embodiment, a continuous path of adjoining tows of glass fibre material is provided along the lateral edges of the pultrusion plate, the continuous path of adjoining tows of glass fibre material extending from the top surface to the opposing bottom surface of the pultrusion plate. While the top and bottom surface of a pultrusion plate is typically covered by peel ply, its lateral edges are typically not. A lateral edge grinding process is usually used to ensure that the resin rich surface on the edges is removed to allow for adhesion of the infusion resin to the pultrusion; otherwise the adhesion between the pultrusion plates and the resin in the blade main spar may not be satisfactory. The inventors have found that bonding of a resin to a ground carbon fibre surface yields low adhesion, whereas, bonding of a resin to a ground glass fibre surface yields better adhesion. Also, it is advantageous if comparatively cheap material and less stiff material is ground off on the edges. Thus, it was found advantageous to place glass fibres along the lateral edges of the pultrusion plate. Therefore, in a preferred embodiment no carbon fibre material is present at the respective lateral edges of the pultrusion plates. In a preferred embodiment, the continuous path of adjoining tows of glass fibre material extends substantially vertically within the pultrusion plate.

In a preferred embodiment, adjoining tows of carbon fibre material means adjacent tows of carbon fibre material that are spaced apart by a distance not more than 100 μm, such as not more than 50 μm, preferably not more 30 μm, such as not more than 20 μm, preferably not more than 10 μm. Such maximum distances are found to provide a sufficiently electrically conductive path between adjoining tows of carbon fibre material.

In a particularly preferred embodiment, the distance between adjoining tows of carbon fibre material is less than 100 μm, preferably less than 50 μm, more preferably less than 20 μm, most preferably less than 10 μm. In some embodiments, the distance between adjoining tows of carbon fibre material is zero.

In a preferred embodiment, the plurality of tows of continuous glass fibre material and the plurality of tows of continuous carbon fibre material form a non-random pattern, preferably a symmetrical pattern, as seen in a vertical cross section of the pultrusion plate. Typically, the pattern is constant over the length of the pultrusion plate. In one embodiment, the pattern is a checkerboard pattern, for example with alternating glass fibre tows and carbon fibre tows in each column and in each row of the pultrusion plate. Such pattern is found to be comparatively easy to manufacture. In another preferred embodiment, the pattern comprises one more vertical columns of carbon fibre tows extending from the top surface to the bottom surface of the pultrusion plate, as seen in a vertical cross section of the pultrusion plate. Other embodiments include patterns with various uniform rows of glass fibre tows on top of various uniform rows of carbon fibre tows, and vice versa. It is preferred that the pattern has reflectional symmetry or bilateral symmetry as appearing on the vertical cross section of the pultrusion plate, such that the left and right sides are mirror images of each other.

In a particularly preferred embodiment, the pattern comprises an I-shaped arrangement of tows of carbon fibre material surrounded by tows of glass fibre material, as seen in a vertical cross section of the pultrusion plate. The term "I-shaped" refers to an arrangement having a first substantially vertical portion, a second substantially horizontal portion substantially perpendicularly coupled to a first end of the first portion, and a third substantially horizontal portion substantially perpendicularly coupled to a second end, i.e. opposite the first end, of the first portion. The second portion extends laterally outward in opposite directions, for example, equidistantly, from the first end of the first portion. The third portion extends laterally outward in opposite directions, for example, equidistantly, from the second end of the first portion. In some embodiments, the pattern comprises more than one I-shaped arrangement, such as two adjacent I-shaped arrangements, of tows of carbon fibre material surrounded by tows of glass fibre material, as seen in a vertical cross section of the pultrusion plate. In another preferred embodiment, the pattern comprises a rectangular arrangement of tows of carbon fibre material surrounded by tows of glass fibre material. These patterns are found to provide satisfactory electrical conductivity through the pultrusion plate in the vertical direction, i.e. along its height/thickness dimension. In particular, an I-shaped arrangement or a rectangular arrangement of tows of carbon fibre material enables maintaining electrical connection through the thickness the stack of pultrusion plates even if the stack is not properly aligned. Additional advantages of these patterns include the ease of changing the carbon/glass ratio and improved adhesion along the edges of the plate.

In a preferred embodiment, the pultrusion plates have a length corresponding to an entire length of a spar cap for a wind turbine blade shell. In a preferred embodiment, the pultrusion plates are bonded with the blade shell material in a resin infusion process.

In one aspect, the present invention relates to a wind turbine blade shell component, such as shell half, obtainable by the method of the present invention. The present invention also relates to a wind turbine blade having a pressure side shell and a suction side shell, wherein the suction and pressure side shells are joined along a leading and trailing edge of the blade. One or both of the suction and pressure side shell components further include a reinforcing structure, such as a spar cap bonded to an interior surface of the shell, wherein the spar cap includes a plurality of pultrusion plates according to the present invention. The pultrusion plates preferably have a continuous unbroken length along an entire length of the spar cap.

In another aspect, the present invention relates to a pultrusion plate formed of a pultrusion fibre material comprising glass fibres and carbon fibres. Preferably, the pultrusion plate is suitable for use in the afore-described method of manufacturing a wind turbine blade shell component.

In a preferred embodiment, the pultrusion plate has a rectangular cross section. In a preferred embodiment, the pultrusion plate has the shape of a rectangular cuboid. The pultrusion plate has a length, which typically extend in a substantially spanwise direction when the pultrusion plate is arranged in the blade shell. The pultrusion plate also has a width, which typically extends in a substantially chordwise direction when the pultrusion plate is arranged in the blade shell. The pultrusion plate also has a height or thickness, which typically extends in a substantially flapwise direction when the pultrusion plate is arranged in the blade shell. The length of the plate is typically its largest dimension. The length of the plate extends in the same direction as its longitudinal axis.

The length of the pultrusion plate is typically between 50 and 150 meters, preferably between 50 and 100 meters, more preferably between 70 and 100 meters. The height/thickness of the pultrusion plate is preferably between 2 and 10 millimeters, preferably between 3 and 7 millimeters, most preferably between 4 and 6 millimeters. The width of the plate is preferably between 20 and 300 millimeters, most preferably between 80 and 150 millimeters. In a preferred embodiment, the reinforcing structure, such as the spar cap, comprises between 1 and 15 stacks of pultrusion plates arranged next to each other, more preferably between 3 and 9 stacks. Each stack may comprise up to 20 pultrusion plates arranged on top of each other, such as 2-20 pultrusion plates or 2-10 pultrusion plates. Thus, each reinforcing section, such as each spar cap, may comprise 10 to 200 pultrusion plates.

In a preferred embodiment, the pultrusion fibre material comprises a plurality of tows of glass fibre material and a plurality of tows of carbon fibre material. Thus, each pultrusion plate may comprise 50-300 tows of fibre material in total, preferably 25-180 tows of fibre material. It is preferred that 10-50% of the tows of fibre material are tows of carbon fibre material. Thus, the tows of carbon fibre material may account for 10-50% of all tows in a pultrusion plates, whereas the tows of glass fibre material may account for 50-90% of all tows of fibre material. The tows will usually extend in the length direction of the pultrusion plate, i.e. substantially parallel to its longitudinal axis, or parallel to the spanwise direction when arranged in the blade shell.

In a preferred embodiment, the tows of glass fibre material and the tows of carbon fibre material are arranged in a regular array or regular grid of rows and columns of tows, as seen in a vertical cross section of the pultrusion plate. The pultrusion plate preferably comprises at least 10 rows and at least 10 columns of tows.

In a preferred embodiment, each pultrusion plate comprises a top surface, an opposing bottom surface and two lateral surfaces, wherein at least one continuous path of adjoining tows of carbon fibre material is provided within the pultrusion plate, the continuous path of adjoining tows of carbon fibre material extending from the top surface to the opposing bottom surface of the pultrusion plate. In a preferred embodiment, a continuous path of adjoining tows of glass fibre material is provided along the lateral edges of the pultrusion plate, the continuous path of adjoining tows of glass fibre material extending from the top surface to the opposing bottom surface of the pultrusion plate.

In a preferred embodiment, the plurality of tows of glass fibre material and the plurality of tows of carbon fibre material form a non-random pattern, preferably a symmetrical pattern, as seen in a vertical cross section of the pultrusion plate. In a preferred embodiment, the pattern comprises an I-shaped or a rectangular arrangement of tows of continuous carbon fibre material surrounded by tows of continuous glass fibre material.

All features and embodiments discussed above with respect to the method of manufacturing a wind turbine blade shell component likewise apply to the pultrusion plate or to the reinforcing structure of the present invention and vice versa.

In another aspect, the present invention relates to a reinforcing structure for a wind turbine blade, the reinforcing structure comprising a plurality of pultrusion plates according to the present invention. The reinforcing structure will typically be a spar cap or a main laminate. In some embodiments, the reinforcing structure comprises a box spar. In other embodiments, the reinforcing structure comprises a spar beam. In a preferred embodiment, the elongate reinforcing structure is a spar structure, such as a spar cap, a spar beam or a box spar. It is preferred that the reinforcing structure extends along the blade in a spanwise direction. Typically, the reinforcing structure will extend over 60-95% of the blade length. The wind turbine blade is usually manufactured from two shell halves, a pressure side shell half and a suction side shell half. Preferably, both shell halves comprise an elongate reinforcing structure, such as a spar cap or a main laminate, according to the present invention.

In another aspect, the present invention relates to a wind turbine blade or to a wind turbine blade component comprising a reinforcing structure according to the present invention, or to a wind turbine blade shell component obtainable by the afore-mentioned method of manufacturing a wind turbine blade shell component. The present invention also relates to a lightning protection system for a wind turbine blade, the lightning protection system comprising a lightning conductor, such as a cable, for example a copper cable, disposed at least partially in the interior of the blade, one or more electrically conducting lightning receptors disposed on one or more of the surfaces of the blade, wherein the one or more electrically conducting lightning receptors are electrically connected to a plurality of pultrusion plates according to the present invention.

The shell halves will typically be produced by infusing a fibre lay-up of fibre material with a resin such as epoxy, polyester or vinyl ester. Usually, the pressure side shell half and the suction side shell half are manufactured using a blade mould. Each of the shell halves may comprise spar caps or main laminates provided along the respective pressure and suction side shell members as reinforcing structures. The spar caps or main laminates may be affixed to the inner faces of the shell halves.

The spar structure is preferably a longitudinally extending load carrying structure, preferably comprising a beam or spar box for connecting and stabilizing the shell halves. The spar structure may be adapted to carry a substantial part of the load on the blade. In some embodiments, the reinforcing structure is arranged within the pressure side shell half. In other embodiments, the reinforcing structure is arranged within the suction side shell half.

In a preferred embodiment, the pressure side shell half and the suction side shell half of the blade are manufactured in respective mould halves, preferably by vacuum assisted resin transfer moulding. According to some embodiments, the pressure side shell half and the suction side shell half each have a longitudinal extent L of 50-100 m, preferably 60-90 m. In a preferred embodiment, the pressure side shell half and the suction side shell half each comprise one or more layers of carbon fibres.

According to some embodiments, the method further comprises a step of arranging one or more shear webs in at least one of the shell halves, usually at the location of the reinforcing structure. Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

In another aspect, the present invention relates to a pultrusion process for manufacturing the pultrusion plate of the present invention, and to a pultrusion plate obtainable by said pultrusion process. Said pultrusion process preferably comprises the provision of a plurality of bobbins carrying respective tows of glass fibre material and a plurality of bobbins carrying respective tows of carbon fibre material. Each tow is advantageously pulled through guide plates, a resin bath, and a heated die by a pulling mechanism. The continuous pultrusion string can be cut into individual pultrusion plates with a length of between 30-200 meters, preferably 50-100 meters, by a cutter. The shaped impregnated plates are then advantageously cured. The guide plates and/or the die may take the form of a spreader or inlet comprising multiple apertures, each aperture receiving a respective carbon fibre tow or glass fibre tow. The apertures can be spaced and they are located so as to guide the fibre tows to form a desired pattern of glass fibre tows and carbon fibre tows in the pultrusion plates.

As used herein, the term "vertical cross section of the pultrusion plate" refers to a cross section of the pultrusion plate on a plane perpendicular to its longitudinal axis, i.e. the axis along the length direction of the pultrusion plate, which is usually the direction in which the pultrusion plate has its greatest extension. When arranged in the blade shell, the longitudinal axis or the length extension of the pultrusion plate will usually coincide substantially with a spanwise direction of the blade.

As used herein, the term "spanwise" is used to describe the orientation of a measurement or element along the blade from its root end to its tip end. In some embodiments, spanwise is the direction along the longitudinal axis and longitudinal extent of the wind turbine blade.

As used herein, the term "horizontal" refers to a direction that is substantially parallel to the chord of the blade when the pultrusion plates are arranged in the blade shell. The vertical direction is substantially perpendicular to the horizontal direction, extending in a substantially flapwise direction of the blade.

DESCRIPTION OF THE INVENTION

Figures 2, 3:
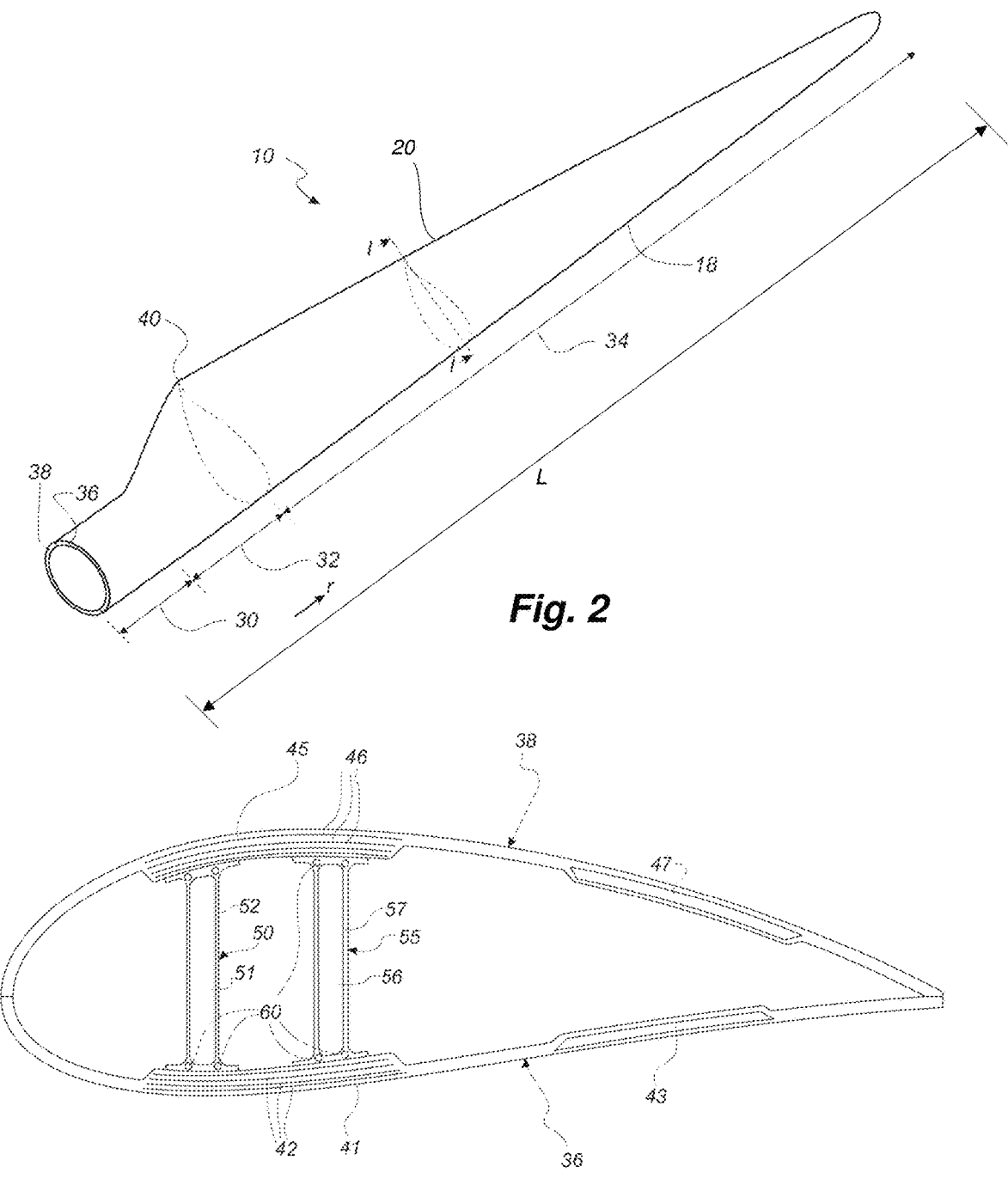
Figure 7:
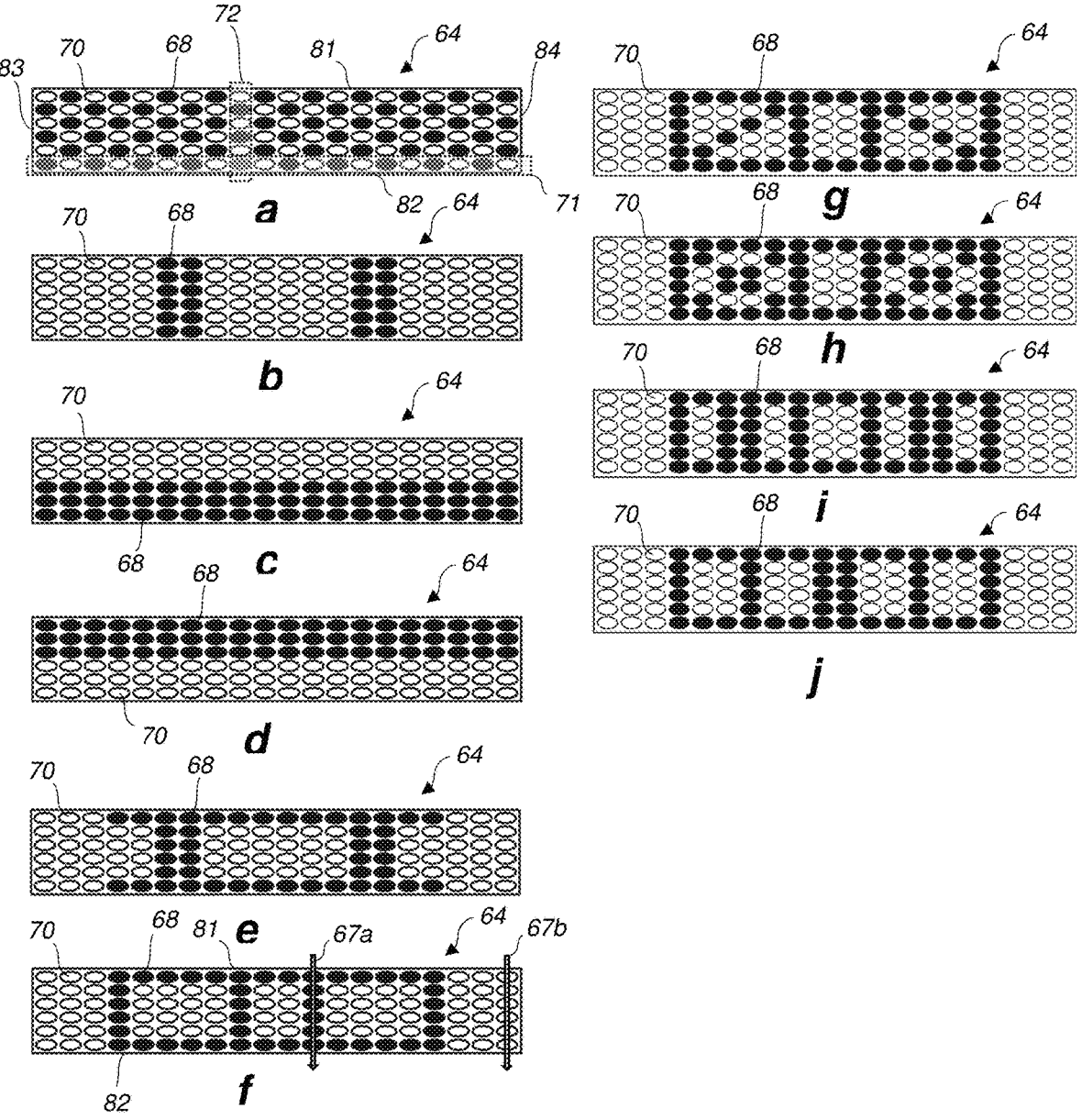
Figure 8:
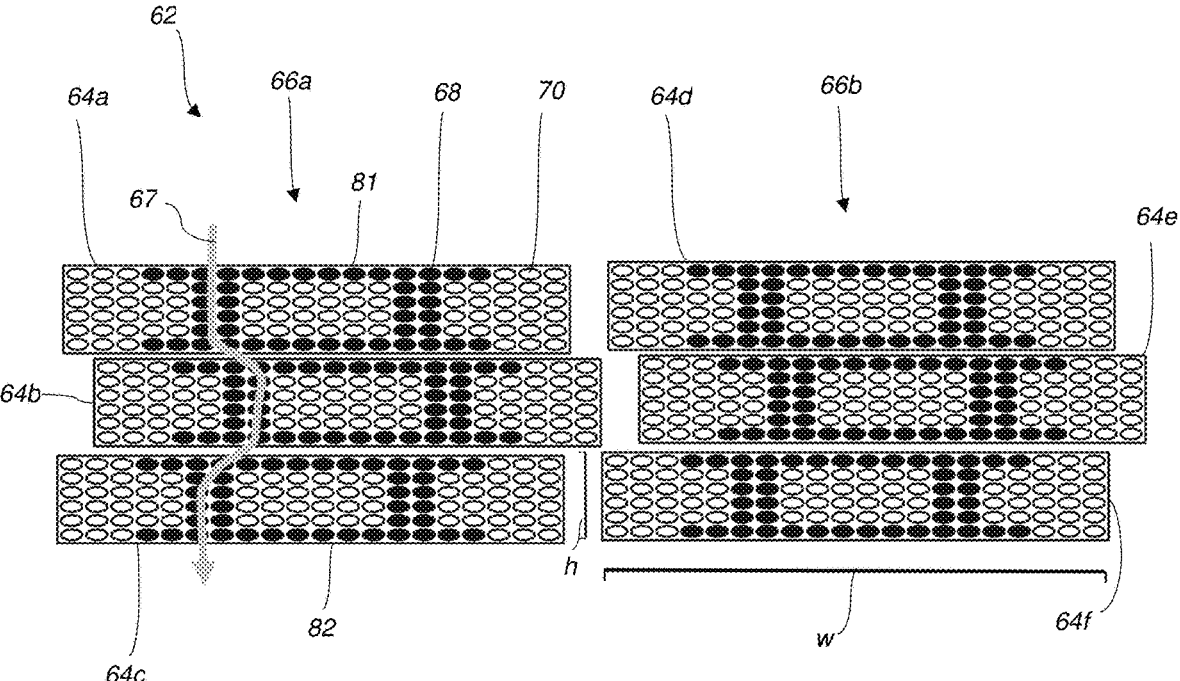

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is a schematic top view of a shell half of a wind turbine blade according to the present invention, FIG. 5 is a schematic vertical cross section through part of a shell half with a reinforcing structure of the present invention, FIG. 6 illustrates a pultrusion process for manufacturing the pultrusion plates of the present invention, FIG. 7 is a schematic vertical cross sectional view of different embodiments of the pultrusion plate of the present invention, and FIG. 8 is a partial vertical cross sectional view of a reinforcing structure of the present invention, illustrating a possible misalignment of the pultrusion plates.

DETAILED DESCRIPTION OF THE FIGURES

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIG. 4 is a schematic top view of a shell half 38 of a wind turbine blade according to the present invention, illustrating the location of a reinforcing structure 62 having a spanwise extent Se. In the illustrated embodiment, the reinforcing structure 62 comprises three adjacent stacks 66a, 66b, 66c of pultrusion plates. As seen in FIG. 4, the elongate reinforcing structure 62 extends in a substantially spanwise direction of the blade, with adjacent stacks 66a, 66b, 66c of pultrusion plates. The elongate reinforcing structure 62 has a tip end 74, closest to the tip end of the blade, and a root end 76, closest to the root end of the blade. The elongate reinforcing structure also comprises a spanwise extending front edge 78, which is closest to the leading edge 18 of the blade, and a spanwise extending rear edge 80, which is closest to the trailing edge 20 of the blade.

FIG. 5 is a schematic vertical cross section through part of a shell half with a reinforcing structure 62 of the present invention, as seen from the root end of the blade. The reinforcing structure 62, such as a spar cap, comprises a plurality of pultrusion plates 64 according to the present invention, arranged in adjacent stacks 66a-e, which are arranged on blade shell material 89 in mould 77 for the blade shell component, such as a shell half. The stacked pultrusion plates 64 are then bonded with the blade shell material 89 to form the blade shell component, such as the shell half with the spar cap. Core material 85 is arranged on either chordwise side of the reinforcing structure 62. A first shear web 50 and a second shear web 55 is placed on the spar cap 62 via respective bond lines 88. The stacks 66a-e may be covered by a carbon biax layer 86 or a carbon veil or a glass/carbon hybrid fabric or a glass/carbon hybrid veil extending towards current connection terminal 87 of a lightning protection system.

FIG. 6 illustrates a pultrusion process for manufacturing the pultrusion plates 64 of the present invention. The pultrusion process makes use of a pultrusion system 90 which comprises a portion for receiving a plurality of bobbins 92 each supplying a tow of glass fibre material 70 and a plurality of bobbins 93 each supply a tow of carbon fibre material 68 from a creel 91. Additional reinforcement material 94 may be provided. The tows 68, 70 are pulled through guide plates 95, resin bath 96, and heated die 97 by pulling mechanism 98. The pultrusion string 100 is cut into individual pultrusion plates 64 by cutter 99. The shaped impregnated fibres are cured and can optionally be wound onto a roll. The guide plates and/or the die may take the form of a spreader or inlet comprising multiple apertures, each aperture receiving a respective carbon fibre tow or glass fibre two. The apertures can be spaced and they are located so as to guide the fibre tows to form a desired pattern of glass fibre tows and carbon fibre tows in the pultrusion plates 64. The enlarged view of the pultrusion plate 64 in FIG. 6 also illustrates its longitudinal axis La and its length l. The height/thickness h and width w of the pultrusion plate are illustrated in FIG. 8, see plate 64f.

Various of the patterns of the present invention are illustrated in FIG. 7, which is a schematic vertical cross sectional view of different embodiments of the pultrusion plate 64 of the present invention, taken along the line a-a' in FIG. 6. Each pultrusion plate 64 in the various embodiments illustrated in FIGS. 7a-j comprises a plurality of tows of glass fibre material 70, indicated as white elliptical shapes, and a plurality of tows of carbon fibre material 68, indicated as black elliptical shapes. As illustrated in FIG. 7a, the tows of glass fibre material 70 and the tows of carbon fibre material 68 are arranged in an array of rows 71 and columns 72 of tows, as seen in a vertical cross section of the pultrusion plate.

As illustrated in FIG. 7a, each pultrusion plate comprises a top surface 81, an opposing bottom surface 82 and two lateral surfaces 83, 84, wherein preferably at least one continuous path 67a of adjoining tows of carbon fibre material is provided within the pultrusion plate 64; see FIG. 7f. The continuous path 67a of adjoining tows of carbon fibre material extends from the top surface 81 to the opposing bottom surface 82 of the pultrusion plate 64. In some embodiments, as shown in the checkerboard pattern of FIG. 7a, said path of adjoining tows of carbon fibre may be a diagonal path extending from the top surface 81 to the opposing bottom surface 82 of the pultrusion plate. Also, in some embodiments, a continuous path 67b of adjoining tows of glass fibre material is provided along the lateral edges 83, 84 of the pultrusion plate 64, the continuous path 67b of adjoining tows of glass fibre material extending from the top surface 81 to the opposing bottom surface 82 of the pultrusion plate; as exemplified in FIG. 7f.

As seen in the various embodiments of FIG. 7, the plurality of tows of glass fibre material 70 and the plurality of tows of carbon fibre material 68 form a non-random pattern, preferably a symmetrical pattern, as seen in a vertical cross section of the pultrusion plate 64. FIG. 7a illustrates a checkerboard pattern, FIG. 7b illustrates a pattern with two vertical lines of tows of carbon fibre material surrounded by tows of glass fibre material, and FIGS. 7c and d illustrated various uniform rows of glass fibre tows on top of various uniform rows of carbon fibre tows, and vice versa. FIG. 7e illustrates a pattern that comprises two adjacent I-shaped arrangements of tows of carbon fibre material surrounded by tows of glass fibre material, whereas FIG. 7f-j show different patterns with rectangular arrangements of carbon fibre tows.

FIG. 8 is a schematic vertical cross sectional view of a reinforcing structure of the present invention, such as a spar cap comprising two chordwise adjacent stacks 66a and 66b of pultrusion plates 64a-f. FIG. 8 also illustrates a possible misalignment of the pultrusion plates 64a-f. Despite the misalignment caused by relative chordwise movement of the pultrusion plates, a continuous path 67 of adjoining tows of carbon fibre material 68 extends from the top surface 81 of the uppermost pultrusion plate 64a to the bottom surface 82 of the lowermost pultrusion plate 64c of each stack of pultrusion plates due to the pattern of tows of carbon fibre material and tows of glass fibre material.

The invention is not limited to the embodiments described herein and may be modified or adapted without departing from the scope of the present invention.

LIST OF REFERENCE NUMERALS

4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 reinforcing structure
64 pultrusion plate
66 stack of pultrusion plates
67 path
68 tow of carbon fibre material
70 tow of glass fibre material
71 row of tows
72 column of tows
74 tip end of reinforcing structure
76 root end of reinforcing structure
77 mould
78 front edge of reinforcing structure
80 rear edge of reinforcing structure
81 top surface of pultrusion plate
82 bottom surface of pultrusion plate
83 first lateral surface of pultrusion plate
84 second lateral surface of pultrusion plate
85 core material
86 carbon biax layer
87 current connection terminal
88 bond line
89 shell material
90 pultrusion system
91 creel
92 bobbin with tow of glass fibre material
93 bobbin with tow of carbon fibre material
94 additional reinforcement material
95 guide plate
96 resin bath
97 heated die
98 pulling mechanism

99 cutter
100 pultrusion string
L length
l length of pultrusion plate
w width of pultrusion plate
h height of pultrusion plate
La longitudinal axis of pultrusion plate
r distance from hub
R rotor radius
Se spanwise extent of reinforcing structure
Ce chordwise extent of reinforcing structure

The invention claimed is:

1. A method of manufacturing a wind turbine blade shell component of a wind turbine blade, the method comprising:
 providing a plurality of pultrusion plates;
 arranging the plurality of pultrusion plates on blade shell material in a mould for the blade shell component;
 bonding the plurality of pultrusion plates with the blade shell material to form the blade shell component,
 providing at least one electrically conducting lightning receptor of a lightning protection system for the wind turbine blade; and
 electrically connecting the at least one electrically conducting lightning receptor to the plurality of pultrusion plates,
 wherein each of the plurality of pultrusion plates is formed of a pultrusion fibre material comprising glass fibres and carbon fibres,
 wherein the pultrusion fibre material comprises a plurality of tows of glass fibre material and a plurality of tows of carbon fibre material,
 wherein each of the plurality of pultrusion plates comprises a top surface, an opposing bottom surface and two lateral surfaces, and
 wherein at least one continuous path of adjoining tows of carbon fibre material is provided within each of the plurality of pultrusion plates, the at least one continuous path of adjoining tows of carbon fibre material extending from the top surface to the opposing bottom surface of each of the plurality of pultrusion plates, and wherein the adjoining tows of carbon fibre material are spaced apart with respect to one another by a distance of not more than 100 μm.

2. The method according to claim 1, wherein the tows of glass fibre material and the tows of carbon fibre material are arranged in an array of rows and columns of tows, as seen in a vertical cross section of one of the plurality of pultrusion plates.

3. The method according to any of claim 1, wherein the plurality of pultrusion plates are arranged into adjacent stacks of pultrusion plates, and wherein a continuous path of adjoining tows of carbon fibre material extends from the top surface of an uppermost pultrusion plate to the bottom surface of a lowermost pultrusion plate of each stack of pultrusion plates, and wherein said continuous path of adjoining tows of carbon fibre material is an electrically conducting path.

4. The method according to claim 1, wherein a continuous path of adjoining tows of glass fibre material is provided along lateral edges of the plurality of pultrusion plates, the continuous path of adjoining tows of glass fibre material extending from the top surface to the opposing bottom surface of one of the plurality of pultrusion plates.

5. The method according to claim 1, wherein the plurality of tows of glass fibre material and the plurality of tows of carbon fibre material form a non-random pattern, as viewed in a vertical cross section of one of the plurality of pultrusion plates.

6. The method according to claim 5, wherein the non-random pattern comprises an I-shaped or a rectangular arrangement of tows of carbon fibre material among adjoining tows of glass fibre material.

7. A wind turbine blade shell component comprising:
 a pultrusion plate formed of a pultrusion fibre material comprising glass fibres and carbon fibres, wherein the pultrusion fibre material comprises a plurality of tows of glass fibre material and a plurality of tows of carbon fibre material,
 wherein the pultrusion plate comprises a top surface, an opposing bottom surface, and two lateral surfaces,
 wherein at least one continuous path of adjoining tows of carbon fibre material is provided within the pultrusion plate, the at least one continuous path of adjoining tows of carbon fibre material extending from the top surface to the opposing bottom surface of the pultrusion plate, and wherein the adjoining tows of carbon fibre material are spaced apart with respect to one another by a distance of not more than 100 μm, and
 wherein at least one electrically conducting lightning receptor of a lightning protection system is electrically connected to the pultrusion plate.

8. The wind turbine blade shell component according to claim 7, wherein the tows of glass fibre material and the tows of carbon fibre material are arranged in an array of rows and columns of tows, as viewed in a vertical cross section of the pultrusion plate.

9. The wind turbine blade shell component according to claim 7, wherein a continuous path of adjoining tows of glass fibre material is provided along lateral edges of the pultrusion plate, the continuous path of adjoining tows of glass fibre material extending from the top surface to the opposing bottom surface of the pultrusion plate.

10. The wind turbine blade shell component according to claim 7, wherein the plurality of tows of glass fibre material and the plurality of tows of carbon fibre material form a non-random pattern, as viewed in a vertical cross section of the pultrusion plate.

11. The wind turbine blade shell component according to claim 10, wherein the non-random pattern comprises an I-shaped or a rectangular arrangement of tows of carbon fibre material among adjoining tows of glass fibre material.

12. A reinforcing structure for a wind turbine blade, the reinforcing structure comprising a plurality of the pultrusion plates according to claim 7.

13. The method according to claim 5, wherein the non-random pattern is a symmetrical pattern.

14. The wind turbine blade shell component according to claim 10, wherein the non-random pattern is a symmetrical pattern.

15. The method according to claim 1, wherein the plurality of tows of glass fibre material and the plurality of tows of carbon fibre material are arranged in rows, wherein a number of the rows is at least ten.

16. The wind turbine blade shell component according to claim 7, wherein the plurality of tows of glass fibre material and the plurality of tows of carbon fibre material are arranged in rows, wherein a number of the rows is at least ten.

* * * * *